(12) United States Patent
Ferraiolo

(10) Patent No.: US 8,646,491 B2
(45) Date of Patent: Feb. 11, 2014

(54) PROTECTIVE WIRE NET, A PROTECTIVE STRUCTURE CONSTRUCTED WITH THE NET, AND THE USE OF THE PROTECTIVE WIRE NET FOR THE CONSTRUCTION OF A PROTECTIVE STRUCTURE

(75) Inventor: Francesco Ferraiolo, Ca' de' Fabbri (IT)

(73) Assignee: Officine Maccaferri S.p.A., Bologna (IT)

( * ) Notice: Subject to any disclaimer, the term of this patent is extended or adjusted under 35 U.S.C. 154(b) by 0 days.

(21) Appl. No.: 12/930,879

(22) Filed: Jan. 19, 2011

(65) Prior Publication Data
US 2011/0114799 A1 May 19, 2011

Related U.S. Application Data

(63) Continuation of application No. 10/576,593, filed as application No. PCT/IT03/00653 on Oct. 22, 2003, now abandoned.

(51) Int. Cl.
*B21F 27/02* (2006.01)

(52) U.S. Cl.
USPC .............................................. 140/6; 140/3 A

(58) Field of Classification Search
USPC ............ 140/4, 6, 7, 92.3–92.94, 3 A; 256/32, 256/33, 45; 245/4, 5, 7–9, 6, 10, 2; 174/117 M; 43/7; 244/110 C, 110 F; 404/70, 134, 36
See application file for complete search history.

(56) References Cited

U.S. PATENT DOCUMENTS

| 109,446 | A | * | 11/1870 | Perkins | ............................ 245/6 |
| 502,470 | A | | 8/1893 | Scarles | |
| 507,865 | A | | 10/1893 | White | |
| 562,308 | A | | 6/1896 | Lane | |
| 1,401,557 | A | | 12/1921 | Riviere et al. | |
| 2,338,785 | A | * | 1/1944 | Sommerfeld | ................... 404/36 |
| 2,948,049 | A | | 8/1960 | Wilson | |
| 3,087,171 | A | * | 4/1963 | Hoagland et al. | ............... 267/86 |
| 3,129,632 | A | | 4/1964 | Starr | |

(Continued)

FOREIGN PATENT DOCUMENTS

| EP | 0 018 619 B1 | 11/1980 |
| KR | 1995-10330 | 12/1995 |
| KR | 20-272952 | 4/2002 |
| KR | 20-318196 | 6/2003 |

OTHER PUBLICATIONS

International Search Report from corresponding International Application No. PCT/IT2003/000653 dated Jul. 5, 2004 (4 pages).

(Continued)

*Primary Examiner* — Teresa M Ekiert
(74) *Attorney, Agent, or Firm* — Flynn, Thiel, Boutell & Tanis, P.C.

(57) ABSTRACT

A protective wire net including an array of longitudinal wires arranged side by side and each intertwined with at least one respective adjacent longitudinal wire. Each of one or more longitudinal metal cables is also intertwined with at least one adjacent longitudinal wire. One or more transverse wires and/or metal cables may also be provided, arranged in a transverse direction relative to the longitudinal wires and outside intertwining regions defined by portions of adjacent longitudinal wires which are bent around one another, the transverse wires and/or metal cables being intertwined or interlaced with one or more of the longitudinal wires.

19 Claims, 5 Drawing Sheets

(56) References Cited

U.S. PATENT DOCUMENTS

| | | |
|---|---|---|
| 3,954,125 A | 5/1976 | Wentzek |
| 4,394,924 A | 7/1983 | Zaccheroni |
| 5,029,779 A | 7/1991 | Bruggeman |
| 5,056,761 A | 10/1991 | Meglino et al. |
| 5,524,875 A | 6/1996 | Thommen, Jr. |
| 6,131,873 A | 10/2000 | Blazon et al. |
| 6,168,118 B1 | 1/2001 | Vancraeynest et al. |
| 6,279,858 B1 | 8/2001 | Eicher |

OTHER PUBLICATIONS

Korean language and English translation of an Office Action issued by the Korean Intellectual Property Office dated Sep. 27, 2011 issued in corresponding Korean Application No. 10-2006-7009921 (8 sheets).

Office Action of Brazilian Patent Office dated Mar. 19, 2013 with partial English translation (5 pages).

* cited by examiner

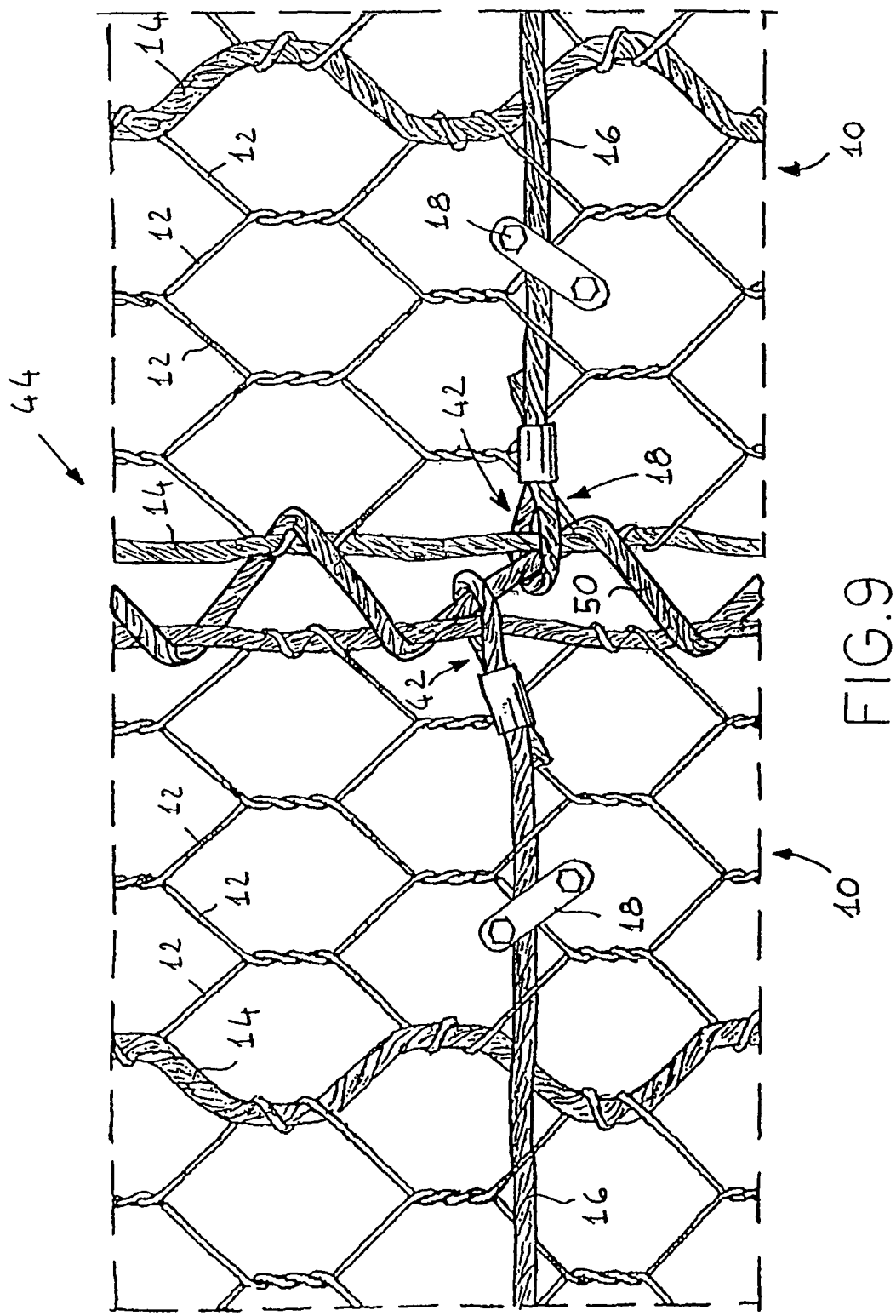

PROTECTIVE WIRE NET, A PROTECTIVE STRUCTURE CONSTRUCTED WITH THE NET, AND THE USE OF THE PROTECTIVE WIRE NET FOR THE CONSTRUCTION OF A PROTECTIVE STRUCTURE

CROSS-REFERENCE TO RELATED APPLICATIONS

This application is a continuation of prior U.S. application Ser. No. 10/576,593, filed Apr. 21, 2006 now abandoned which was the National Stage of International Application No. PCT/IT2003/000653, filed Oct. 22, 2003.

FIELD OF THE INVENTION

The present invention relates to the field of protective wire nets. The invention has been developed with particular reference to a protective wire net comprising an array of longitudinal wires arranged side by side and each intertwined with at least one adjacent longitudinal wire.

The present invention also relates to a protective structure comprising at least one protective wire net of the abovementioned type and to the use of this protective wire net to construct the structure.

BACKGROUND OF THE INVENTION

In the field of protective wire nets, it is known to produce protective nets which are constituted by wires that are intertwined with one another. These nets are generally used to construct structures for protecting embankments, rocky slopes, or similar earth structures to prevent the detachment of rocks or the progress of landslides and avalanches which might put roadways, habitations, infrastructures, or heavily frequented areas at risk. Known protective structures are composed of nets of the above-mentioned type which are anchored to the ground by metal stakes or other anchorings which constitute nodal points of the structure.

Frequently, the strength of known nets is not sufficient to withstand the stresses to which they are subjected and it is therefore necessary to superimpose reinforcing cables or panels on the nets by fixing them to the metal stakes or to the other anchorings. In this case, the numerous steps in the fixing of the nets and of the cables or panels, which are generally performed in poorly accessible areas, render the installation of the entire protective structure quite impractical, consequently extending installation times and inevitably increasing installation costs.

The object of the present invention is to solve the problems of the prior art by providing a very reliable and strong protective net, the use of which enables protective structures to be constructed easily, quickly, and at a low cost.

Another object of the present invention is to provide a protective wire net which is of inexpensive construction and which can be produced by a conventional machine operation.

In order to achieve the objects indicated above, the subject of the invention is a protective wire net of the type indicated in the introduction to this description which further comprises one or more longitudinal metal cables, each intertwined with at least one adjacent longitudinal wire.

One of the main advantages of the present invention is the particular tensile strength of the net in the longitudinal direction of the cables included therein. This characteristic enables protective structures to be constructed without additional cables or panels superimposed on the nets, thus reducing installation times and costs. Another advantage of the present invention is that the wires and the cables can be netted simultaneously by means of conventional machines which thus enable the cables to be incorporated in the wire net by means of a single process and to be distributed in accordance with any predetermined pattern.

According to another characteristic of the present invention, transverse wires and/or metal cables may be arranged in a transverse direction relative to the wires and outside or inside intertwining regions defined by portions of adjacent longitudinal wires which are bent around one another. The transverse wires and/or metal cables thus arranged are intertwined or interlaced with one or more of the longitudinal wires.

The main advantage which results from the insertion of transverse wires and/or metal cables is that of increasing the strength of the net in the direction transverse the longitudinal wires in a simple manner. The introduction of the wires and/or cables does not in fact involve modification of the conventional net-production process but purely the addition of a step after the longitudinal wires have been netted.

BRIEF DESCRIPTION OF THE DRAWINGS

Further characteristics and advantages will become clear from the following detailed description given with reference to the appended drawings which are provided purely by way of non-limiting example and in which:

FIG. 9 is a partial view from above of a protective structure comprising at least two protective wire nets according to the present invention; in particular, the connection region of the two nets is shown.

DETAILED DESCRIPTION

Figure 1:
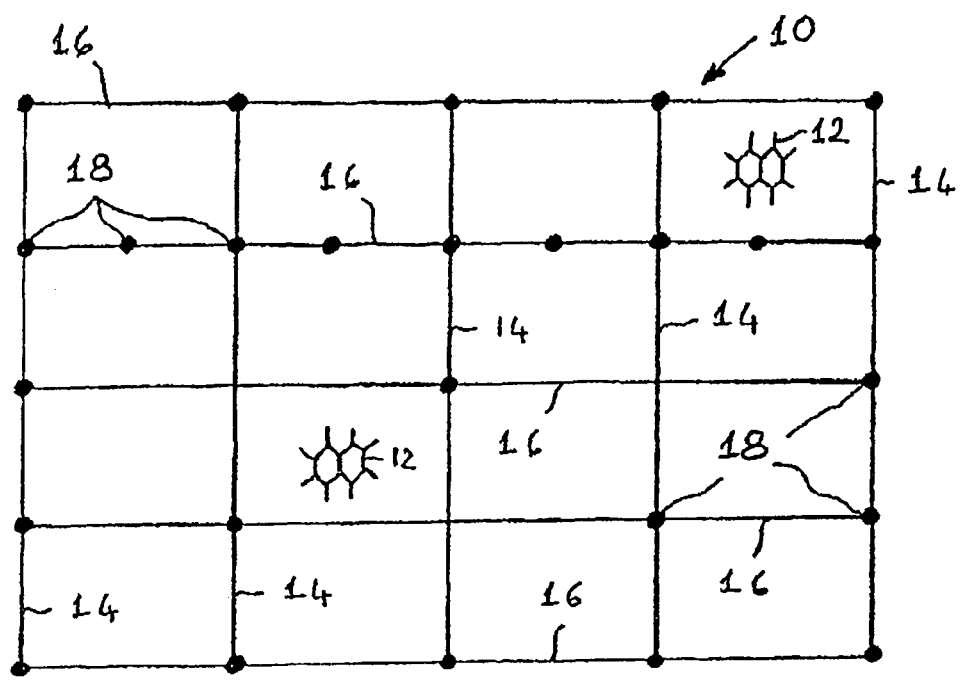
FIG. 1 is a generalized diagram of a protective wire net according to the present invention.

With reference now to FIG. 1, a protective wire net 10, preferably but in non-limiting manner a double-twist net with hexagonal meshes, comprises an array of wires 12 which are arranged side by side and each of which is intertwined with at least one respective longitudinal wire 12. The wires 12 may preferably but in non-limiting manner be made of ordinary steel such as, for example, a steel with a tensile strength of about 500 Mpa; naturally this value is not intended to be limiting of the invention.

Each of one or more metal cables 14, 16 is intertwined or interlaced with at least one adjacent longitudinal wire 12. The metal cables 14, 16 may be arranged in two preferential directions and, preferably but in non-limiting manner, may be joined to each other or to the wires 12 by anchoring means 18. The anchoring means 18 may be arranged, for example but in non-limiting manner, at each point of intersection of two cables 14, 16 or only at some points and, preferably, at the ends of each cable 14, 16. The distribution of the anchoring means 18 in the wire net 10 is substantially uniform but the anchoring means 18 may be concentrated in predetermined regions of the wire net 10 if it is necessary to produce a protective wire net which comprises regions having different surface strengths.

The distribution of the cables 14, 16 in the wire net 10 is also substantially uniform, but their positions may be varied in predetermined regions. In particular, it has been found that, in terms of strength, it is particularly advantageous to arrange the cables 14, 16 at regular intervals within the range of from 20 cm to 1.5 meters with preferred intervals of 25, 40, 50 and 100 centimeters. However, these values should not be considered as being in any way limiting of the invention.

The remaining drawings show, by way of example, some embodiments of the invention in which the same reference numerals have been used to indicate corresponding elements.

Figure 2:
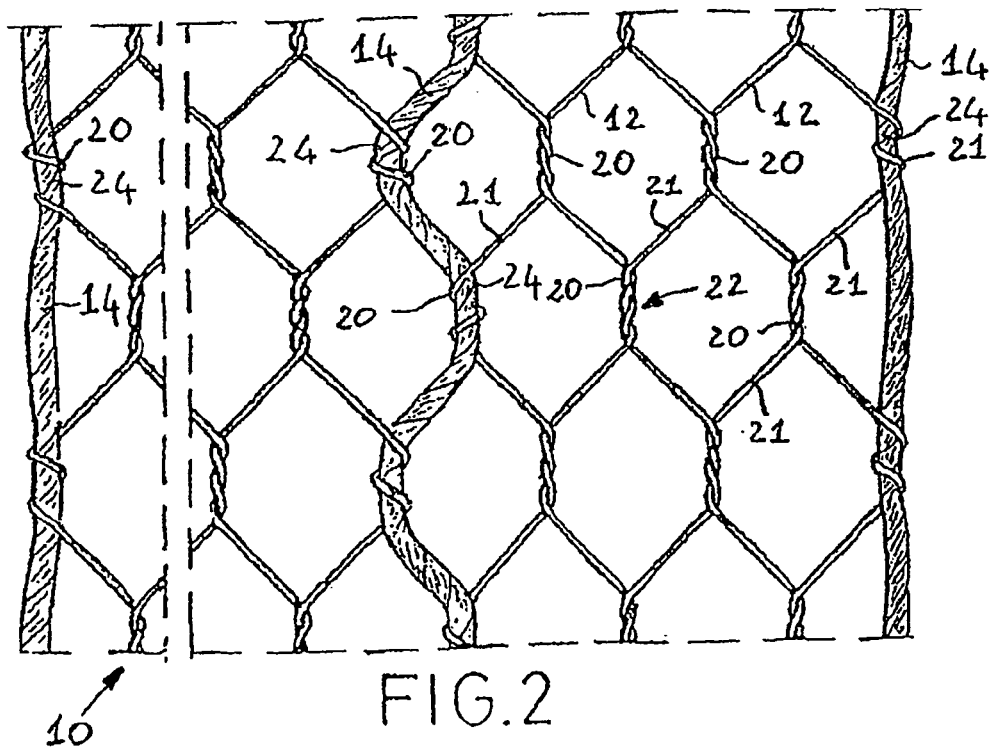
FIG. 2 is a partial view of a protective wire net according to the present invention from above.

With reference now to FIG. 2, a protective wire net 10 comprises an array of longitudinal wires 12 each of which comprises at least one twisted portion 20 and one non-twisted portion 21 and which are arranged side by side so as to define a longitudinal direction of the protective wire net 10. Each wire 12 is intertwined with at least one other respective longitudinal wire 12, preferably in their respective twisted portions 20.

The wire net 10 further comprises one or more longitudinal metal cables 14 interposed between the wires 12. The longitudinal cables 14 may be arranged between two wires 12 or beside one wire, for example, at an edge of the wire net 10. The longitudinal metal cables 14 comprise portions 24 around which twisted portions 20 of at least one or more adjacent wires 12 are twisted. According to a further advantageous characteristic of the present invention, the longitudinal cables 14 may also comprise twisted portions which are engaged with the longitudinal wires of the wire net. The wires and the metal cables have different structures including wherein the at least one metal cable is thicker than the wires and each wire is a single strand of material and each cable is comprised of several strands of material twisted together.

Figure 3:
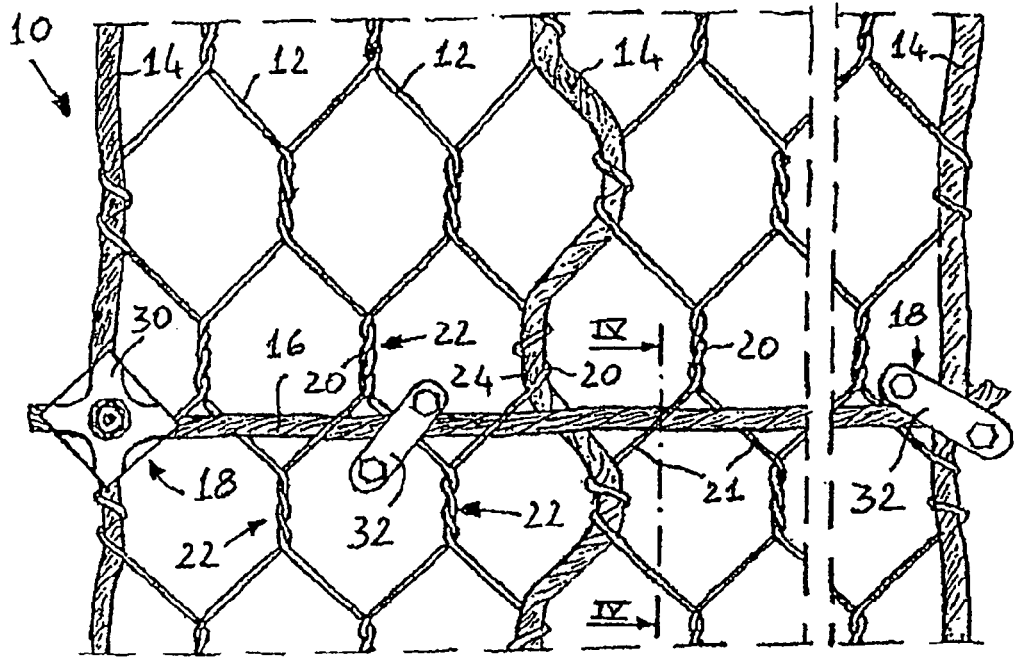
FIG. 3 is a partial view of another protective wire net according to the present invention from above.

FIG. 3 shows a further embodiment of the present invention in which a protective wire net 10 similar to that shown in FIG. 2 comprises one or more transverse cables 16 arranged transversely relative to the longitudinal cables 14. The transverse cables 16 are intertwined or interlaced, throughout their length or for only part thereof, with the wires 12 and/or with the longitudinal cables 14 and are arranged outside intertwining regions 22 defined by two twisted portions 20 of wires 12 and/or by the portions 24 of longitudinal cables 14.

Figure 5:
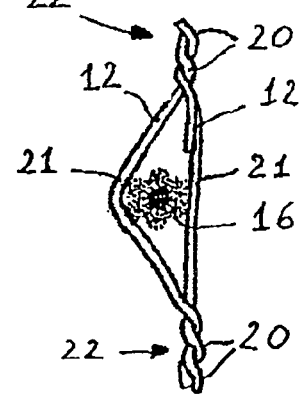
FIG. 5 is a partial view sectioned on the line IV of FIG. 3.

To facilitate the arrangement of a transverse cable 16 within a wire net 10, passages may be formed between the wires 12 and, for example as shown in FIG. 5, may be constituted by respective central bends in the non-twisted portions 21. The path of a transverse cable 16 through the protective wire net 10 preferably but in non-limiting manner comprises non-twisted portions 21 with central bends and non-twisted portions 21 without central bends, arranged in alternation with one another.

Figure 8:
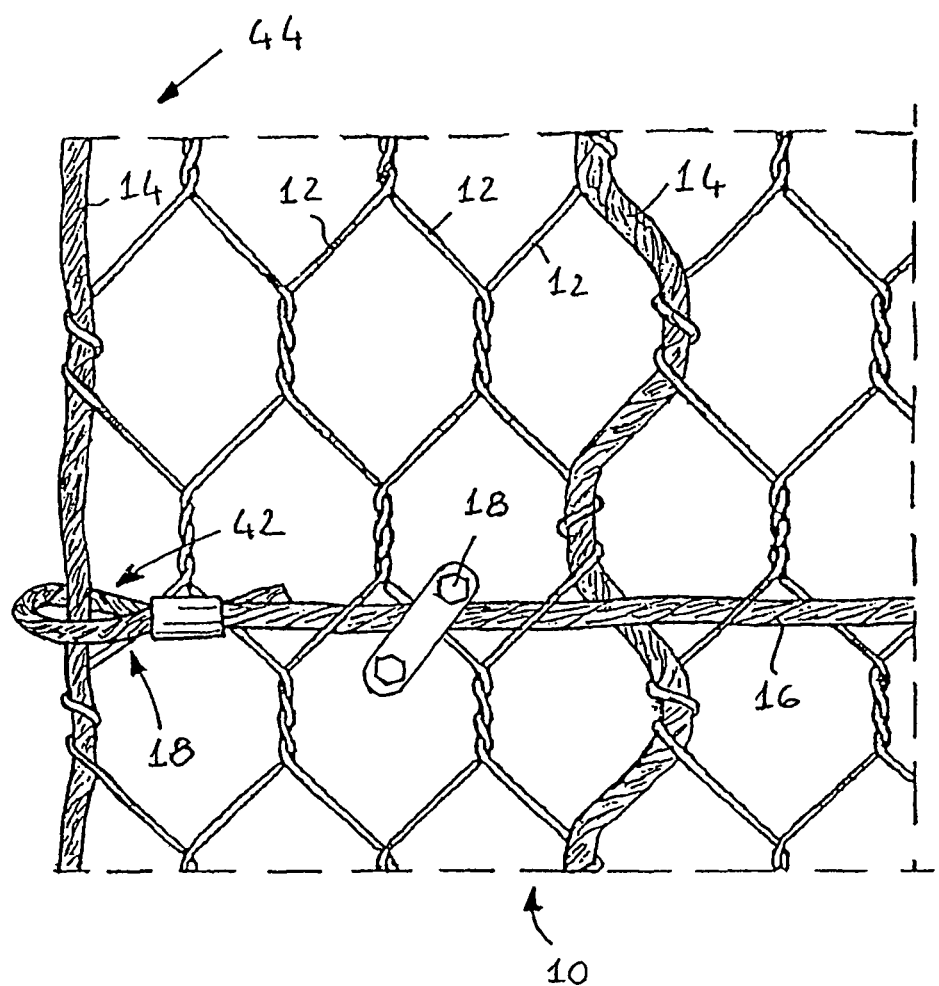
FIG. 8 is a partial view of an edge portion of a net according to the present invention from above.

Preferably, the transverse cables 16 are secured relative to the wires 12 and/or to the longitudinal cables 14 by the above-described anchoring means 18, more preferably by shaped plates 30 or clamps 32, as shown in FIG. 3, and even more preferably by means of eyes 42 formed directly in the transverse cables 16 or engaged thereon as shown in FIG. 8. Naturally, anchoring means of the same type or of different types may equally well be used in the same net, without thereby departing from the scope of the present invention.

Figure 4:
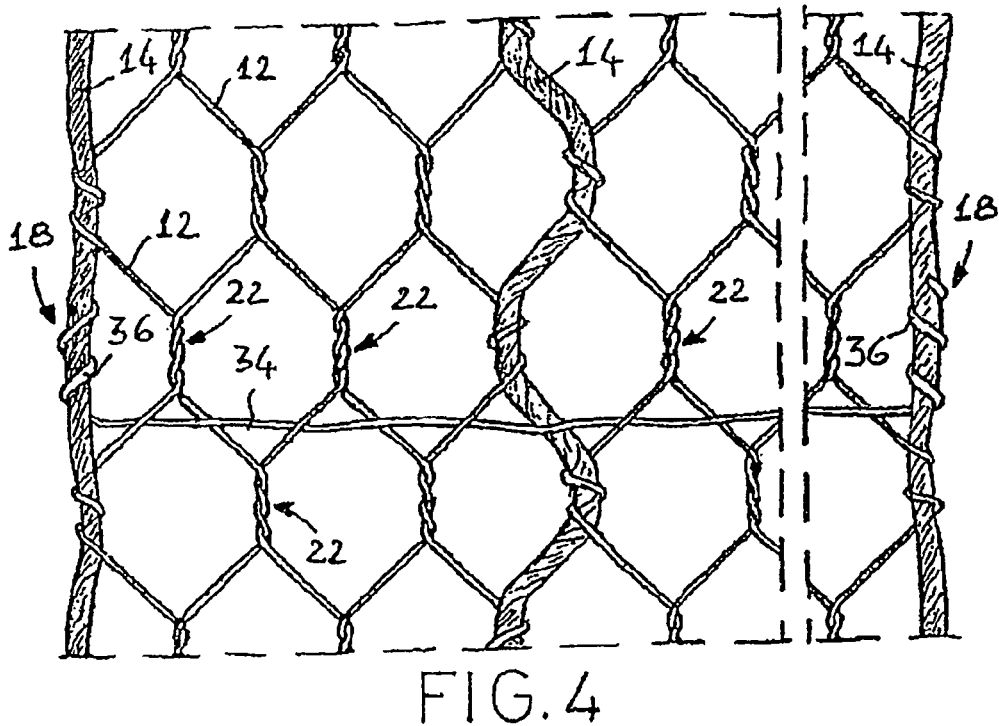
FIG. 4 is a partial view of a further protective wire net according to the present invention from above.

In one of the further embodiments shown in FIG. 4, the protective wire net 10 comprises one or more transverse wires 34 which are engaged with the wires 12 or with the longitudinal cables 14 by means of the above-described anchoring means 18. In this configuration, the anchoring means 18 disposed at the edge of the net 10 comprise an end 36 of each transverse wire 34 which is bent onto a wire 12 or onto a longitudinal cable 14.

Figure 6:
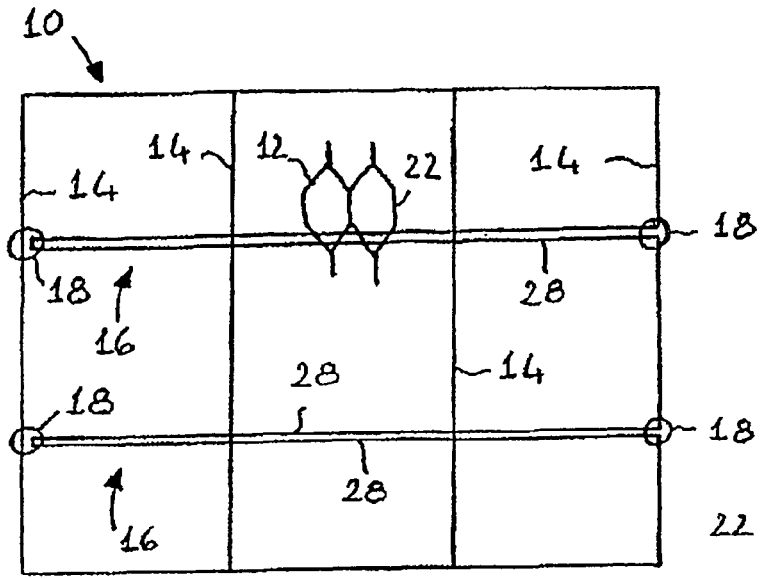
FIG. 6 is a schematic view of a variant of the net of FIG. 3 from above.
Figure 7:
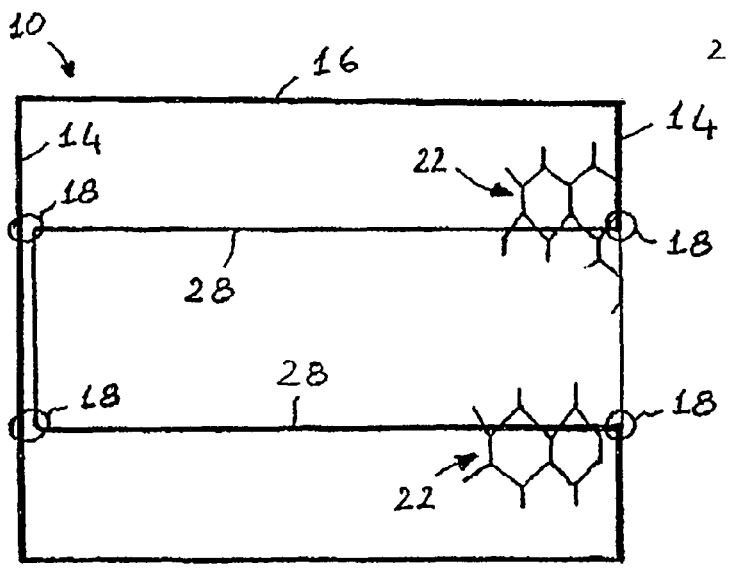
FIG. 7 is a schematic view of a further variant of the protective wire net of FIG. 3 from above.

As shown in FIGS. 6 and 7, the transverse cables may comprise one or more bent portions 28 of longitudinal cables 14. Preferably but in non-limiting manner, the bent portions 28 form parts of longitudinal cables 14 that are disposed at the edge of the net 10, and they extend from one extremity of the net to the other. Different bent portions 28 may extend through the same meshes of the wire net, as shown in FIG. 6, or may equally well extend through different meshes, as shown in FIG. 7.

A protective structure formed in accordance with the present invention comprises one or more protective wire nets 10 as described above and means of known type for fixing to the ground, such as hook-headed spikes, ties, or rivets, preferably engaged with the cables 14, 16. Two or more wire nets may be joined together by coupling means such as, for example, rings, clips, cables, or equivalent means.

According to a particularly advantageous embodiment of the present invention, the coupling means comprise coupling elements formed directly on one or more transverse cables 16 of at least one of the wire nets. As shown in FIG. 9, the transverse cables 16 comprise, for example, at one end thereof, a portion which is bent and clamped to itself to form a loop-like element or eye 42. A further coupling element such as a wire, a rope, or a cable 50 is arranged through the meshes of the two nets 10 and the eyes 42 of the transverse cables 16, connecting pairs of adjacent eyes 42 to one another.

The overall resistance of the protective structure to external stresses can thus be increased, both because the two wire nets 10 are firmly joined together and because the protective structure has a continuity of transverse cables 16 also including the coupling cable 50.

In the embodiment shown in FIG. 9, the protective wire nets 10 which are joined together are oriented with the longitudinal wires 12 arranged in the same direction. In this case, the coupling means 42, 50 are disposed at the ends of the transverse metal cables 16. Alternatively, the coupling means may also be arranged in regions remote from the edges of the wire net 10 so that the joining region of two or more nets comprises overlapping portions of wire nets.

Naturally, many variations may be provided for without thereby departing from the scope of the present invention. For example, the wire nets which form the protective structure may be arranged in different orientations and the coupling means may also be formed on the longitudinal metal cables and transverse metal cables may extend through them.

In use, one or more nets 10 are placed on a portion of a slope, embankment, or similar earth structure which is to be protected, for example, to prevent the detachment of rocks or stones. Each net is then fixed to the portion of slope by the application of a plurality of fixing means with a uniform distribution or with a concentrated distribution in regions where greater strength is required. Alternatively, stakes or posts are fixed in the ground leaving at least a portion projecting and then one or more nets 10 are suspended and fixed on the projecting portions in an inclined position relative to the ground. This arrangement is particularly advantageous for checking the progress of moving masses such as landslides, avalanches or tree-trunks.

Naturally, the principle of the invention remaining the same, the forms of embodiment and details of construction may be varied widely with respect to those described and illustrated without thereby departing from the scope of the present invention.

What is claimed is:

1. A protective double-twist wire net with hexagonal meshes comprising:
an array of elongate and longitudinally-extending elements comprising wires and metal cables arranged in side-by-side relation with one another and forming hexagonal meshes, each of said elements extending longitudinally in a longitudinal direction, adjacent pairs of said elements being intertwined with one another at intertwining regions defined by portions of the respective said elements which are twisted around one another, each said intertwining region consisting only of a pair of said elements intertwined with one another, said pair of said elements consisting of either two of said wires or one of said wires and one of said metal cables, each said metal cable interposed in said array being located between a twosome of said wires and being intertwined with a first one of said twosome of said wires at at least two spaced intertwining regions and with a second one of said twosome of said wires at at least one of said intertwining regions, said at least one of said intertwining regions being located between said at least two spaced intertwining regions, wherein said portions of the respective said elements which define said intertwining regions are doubly-twisted around one another, and wherein one of said metal cables defines three adjacent sides of one of said hexagonal meshes, wherein the wires and the metal cables have different structures.

2. The protective double-twist wire net of claim 1, wherein said metal cables are arranged at regular intervals with one another across said array and in an alternating manner with one or more of said wires.

3. The protective double-twist wire net of claim 1, wherein at least one of said metal cables is an elongate and longitudinally-extending edge metal cable having portions around which only one of said longitudinally-extending wires is twisted, said edge metal cable defining a terminal longitudinally-extending edge of said protective wire net.

4. The protective double-twist wire net of claim 1, wherein said protective wire net further comprises an additional metal cable or wire extending in a direction transverse to said longitudinally-extending elements and having a portion disposed longitudinally between two longitudinally-adjacent intertwining regions.

5. The protective double-twist wire net of claim 4, wherein said additional metal cable or wire is disposed between two longitudinally-adjacent and longitudinally spaced-apart intertwining regions so as to be intertwined with non-twisted portions of said wires extending longitudinally between said two longitudinally-adjacent and longitudinally spaced-apart intertwining regions as said additional metal cable or wire extends transversely across said array.

6. The protective double-twist wire net of claim 5, wherein said additional metal cable or wire is a first transverse metal cable section and said protective wire net further comprises a longitudinally-extending side metal cable section having portions around which one of said longitudinally-extending wires is twisted, said first transverse metal cable section being connected to said side metal cable section at a bend.

7. The protective double-twist wire net of claim 5, wherein said additional metal cable or wire has terminal ends and a ring-shaped anchor is disposed on each said terminal end of said metal cable or wire, one of said wires extending through each said anchor.

8. The protective double-twist wire net of claim 5, wherein said protective wire net is connected to a mechanism for fixing said protective wire net to a slope.

9. The protective double-twist wire net of claim 1, wherein said at least one of said hexagonal meshes has two opposing sides, a first one of said two opposing sides being defined by a first one of said intertwining regions formed by one of said wires and one of said metal cables and a second one of said two opposing sides being defined by a second one of said intertwining regions formed by two of said wires, two cable adjacent sides of said at least one of said hexagonal meshes adjacent to the first one of said two opposing sides being defined by said one of said metal cables and two wire adjacent sides of said at least one of said hexagonal meshes adjacent to the second one of said two opposing sides being defined by one of said two of said wires.

10. The protective double-twist wire net of claim 1, wherein the metal cables are thicker than the wires.

11. The protective double-twist wire net of claim 1, wherein each wire is a single strand of material and each metal cable is comprised of several strands of material twisted together.

12. A protective double-twist wire net with hexagonal meshes comprising:
an array of elongate and longitudinally-extending elements comprising wires and at least one metal cable arranged in side-by-side relation with one another and forming hexagonal meshes, each of said elements extending longitudinally in a longitudinal direction, adjacent pairs of said elements being intertwined with one another at intertwining regions defined by portions of the respective said elements which are twisted around one another, each said intertwining region consisting essentially of a pair of said elements intertwined with one another, said pair of said elements consisting essentially of either two of said wires or one of said wires and one of said at least one metal cable, each said at least one metal cable interposed in said array being located between a twosome of said wires and being intertwined with a first one of said twosome of said wires at at least two spaced intertwining regions and with a second one of said twosome of said wires at at least one of said intertwining regions, said at least one of said intertwining regions being located between said at least two spaced intertwining regions, wherein said portions of the respective said elements which define said intertwining regions are doubly-twisted around one another, and wherein the at least one metal cable defines three adjacent sides of one of said hexagonal meshes;
wherein the wires and the at least one metal cable have different structures.

13. The protective double-twist wire net of claim 12, wherein said at least one of said hexagonal meshes has two opposing sides, a first one of said two opposing sides being defined by a first one of said intertwining regions formed by one of said wires and one of said metal cables and a second one of said two opposing sides being defined by a second one of said intertwining regions formed by two of said wires, two cable adjacent sides of said at least one of said hexagonal meshes adjacent to the first one of said two opposing sides being defined by said one of said metal cables and two wire adjacent sides of said at least one of said hexagonal meshes adjacent to the second one of said two opposing sides being defined by one of said two of said wires.

14. The protective double-twist wire net of claim 12, wherein the at least one metal cable is thicker than the wires.

15. The protective double-twist wire net of claim 12, wherein each wire is a single strand of material and the at least one metal cable is comprised of several strands of material twisted together.

16. A protective double-twist wire net with hexagonal meshes comprising:
- a first wire, a second wire and a metal cable arranged in side-by-side relation with one another, with the metal cable being located between the first wire and the second wire;
- the metal cable being intertwined with the first wire at a plurality of spaced first intertwining regions defined by portions of the metal cable and the first wire being twisted around one another;
- the metal cable also being intertwined with the second wire at a plurality of spaced second intertwining regions defined by portions of the metal cable and the second wire being twisted around one another;
- the metal cable being intertwined with the first wire and the second wire such that at least one of the first intertwining regions is located between two of the second intertwining regions and at least one of the second intertwining regions is located between two of the first intertwining regions;
- a third wire adjacent the second wire, the third wire being intertwined with the second wire at a plurality of spaced third intertwining regions defined by portions of the third wire and the second wire being twisted around one another;
- wherein the wires and the metal cable form hexagonal meshes;
- wherein the first wire and the metal cable are doubly-twisted around one another in the first intertwining regions, the second wire and the metal cable are doubly-twisted around one another in the second intertwining regions, the third wire and the second wire are doubly-twisted around one another in the third intertwining regions, wherein the metal cable defines three adjacent sides of at least one of the hexagonal meshes; and
- wherein the wires and the metal cable have different structures.

17. The protective double-twist wire net of claim 16, wherein the at least one of the hexagonal meshes has two opposing sides, a first one of the two opposing sides being defined by one of the second intertwining regions and a second one of the two opposing sides being defined by the third intertwining region, two cable adjacent sides of the at least one of the hexagonal meshes adjacent to the first one of the two opposing sides being defined by the metal cable and two wire adjacent sides of the at least one of the hexagonal meshes adjacent to the second one of the two opposing sides being defined by the second wire.

18. The protective double-twist wire net of claim 16, wherein the metal cable is thicker than the wires.

19. The protective double-twist wire net of claim 16, wherein each wire is a single strand of material and the metal cable is comprised of several strands of material twisted together.

* * * * *